United States Patent [19]
Zegler et al.

[11] Patent Number: 5,855,981
[45] Date of Patent: Jan. 5, 1999

[54] PROCESS OF RECYCLING WASTE POLYMERIC MATERIAL AND AN ARTICLE UTILIZING THE SAME

[75] Inventors: Stephen A. Zegler, Cohutta, Ga.; Paul L. Weinle, Concord, N.C.

[73] Assignee: Collins & Aikman Floorcoverings, Inc., Dalton, Ga.

[21] Appl. No.: 826,431

[22] Filed: Mar. 18, 1997

Related U.S. Application Data

[63] Continuation of Ser. No. 517,230, Aug. 21, 1995, abandoned, which is a continuation of Ser. No. 517,571, Aug. 21, 1995, each is a continuation of Ser. No.193,801, Feb. 9, 1994, abandoned.

[51] Int. Cl.⁶ ................................................. B32B 3/02
[52] U.S. Cl. ................................. 428/95; 428/97
[58] Field of Search ............................ 428/95, 97

[56] References Cited

U.S. PATENT DOCUMENTS

| | | | |
|---|---|---|---|
| 3,334,153 | 8/1967 | Fukushima et al. | 260/857 |
| 3,551,231 | 12/1970 | Smedberg | 428/97 |
| 3,560,284 | 2/1971 | Wisotzky et al. | 156/72 |
| 3,654,219 | 4/1972 | Boyer et al. | 260/41.5 |
| 3,658,752 | 4/1972 | Das et al. | 260/41.5 |
| 3,661,691 | 5/1972 | Slosberg | 418/95 |
| 3,695,987 | 10/1972 | Wisotzky et al. | 161/67 |
| 3,698,973 | 10/1972 | Wisotzky et al. | 156/78 |
| 3,728,182 | 4/1973 | Wisotzky et al. | 156/72 |
| 4,003,866 | 1/1977 | Paturle | 260/17.4 R |
| 4,028,159 | 6/1977 | Norris | 156/94 |
| 4,105,709 | 8/1978 | Iwami et al. | 260/2.857 |
| 4,158,646 | 6/1979 | Benkowski et al. | 260/2.3 |
| 4,250,222 | 2/1981 | Mavel et al. | 428/285 |
| 4,359,556 | 11/1982 | Lakshmanan et al. | 525/420.5 |
| 4,371,576 | 2/1983 | Machell | 428/92 |
| 4,437,918 | 3/1984 | Morohashi et al. | 156/322 |
| 4,870,110 | 9/1989 | Mehra et al. | 521/46.5 |
| 4,877,827 | 10/1989 | Van Der Groep | 524/477 |
| 4,968,463 | 11/1990 | Levasseur | 264/40.1 |
| 4,988,764 | 1/1991 | Nisho et al. | 525/66 |
| 5,010,138 | 4/1991 | Westeppe et al. | 525/183 |
| 5,112,908 | 5/1992 | Epstein | 515/66 |
| 5,122,404 | 6/1992 | Fowler | 428/87 |
| 5,122,569 | 6/1992 | Scheibelhoffer et al. | 525/66 |
| 5,217,655 | 6/1993 | Schmidt | 264/22 |
| 5,294,384 | 3/1994 | David et al. | 264/37 |

FOREIGN PATENT DOCUMENTS

| | | |
|---|---|---|
| 2080259 | 4/1993 | Canada . |
| 0511469 | 11/1992 | European Pat. Off. . |
| 2 049 540A | 12/1980 | United Kingdom . |
| 93/19654 | 10/1993 | WIPO . |

*Primary Examiner*—Terrel Morris
*Attorney, Agent, or Firm*—J. Michael Martinez De Andino; McGuire, Woods, Battle & Booth LLP

[57] ABSTRACT

The present invention provides a process for recycling waste polymeric material comprising a mixture of waste polymeric material wherein the waste polymeric material includes from about 15 to 50 percent aliphatic polyamide material; granulating the chopped mixture into fragments at least about 100 times smaller than the size of the waste polymeric material; and extruding the ground mixture at a temperature of less than about the $T_g$ of the lowest melting waste aliphatic polyamide polymeric material.

3 Claims, 3 Drawing Sheets

PROCESS OF RECYCLING WASTE POLYMERIC MATERIAL AND AN ARTICLE UTILIZING THE SAME

RELATED APPLICATIONS

This is a continuation of prior application Ser. No. 08/517,230 filed Aug. 21, 1995, now abandoned and is also related to application Ser. No. 08/664,954 filed Jun. 13, 1996, which is a continuation of prior application Ser. No. 08/517,571 filed Aug. 21, 1995, all of which are continuations of prior application Ser. No. 08/193,801 filed Feb. 9, 1994, now abandoned.

BACKGROUND AND FIELD OF THE INVENTION

The present invention relates to recycling and reclaiming waste polymeric material, and forming an article therefrom, and more particularly forming a floor covering utilizing the recycled and reclaimed waste polymeric material.

There has been an increased interest in recycling, reclaiming and reutilizing waste and scrap material, and particularly waste thermoplastic polymeric material from a variety of sources. The recycling of most mixtures of thermoplastic scrap material is limited by the incompatibility of the various different kinds of thermoplastic material present in the scrap. For example, the various thermoplastic resins are often insoluble in each other resulting in a heterogeneous mixture in which each type of resin forms a dispersed phase in the other. This often results in adversely affecting the mechanical properties (e.g., tensile and impact strength) and aesthetic properties of any articles formed from such a mixture.

One suggestion to overcome this problem is to sort the scrap material based on the specific thermoplastic material present. Such sorting, however, is impractical from both a technical and economic standpoint. Thus various other solutions have been proposed with respect to recycling waste polymeric material. For example, U.S. Pat. No. 4,250,222 to Mavel et al. proposes coarsely grinding a mixture of two or more mutually incompatible thermoplastic resins, incorporating into the coarsely ground thermoplastic resin mixture, through the application of heat and pressure, from about 5 to about 25 parts by weight of a fibrous material, and forming the resin/fiber mass into an article.

U.S. Pat. No. 4,968,463 to Levasseur proposes shredding or granulating polymeric waste, drying the material to a water content of not more than 8% by weight, preheating the material to a temperature of 80° C. to 160° C., kneading at a temperature of 120° to 250° C. and injection molding or extrusion of the material to form a product such as a fence post.

Processes for recycling floor covering have also been desired inasmuch as a particularly large amount of scrap material is generated during the manufacture of floor covering. For example, in the manufacture of tufted carpet, the tufted carpet may have nylon pile secured in a primary backing of a woven polypropylene fabric which has a secondary vinyl plastic backing. The pile, the primary backing and secondary backing are typically each a thermoplastic having different characteristics.

Specific to recycling carpet, U.S. Pat. No. 4,028,159 to Norris proposes a process for reclaiming selvedge formed during manufacturing. The process comprises heating the selvedge in air to a temperature above the melting points of the resins to melt and degrade the resins; separating melted resin from solid residue to reclaim meltable resin from the selvedge; and utilizing the reclaimed resins as a substitute for at least a portion of the high molecular weight resins in an adhesive mixture in subsequent carpet production.

U.S. Pat. No. 4,158,645 to Benkowski et al. proposes applying a shearing force (e.g., using a Banbury mixer) to tear the fabric fibers into lengths no greater than about 0.25 inch. This forms a mixture of thermoplastic resin and short lengths of fabric fibers. The resulting mixture is subjected to heat and pressure, such as by a drop mill and thus banded. After the mixture is banded, it can be calendared onto a web of fabric to form a finished reinforced sheet or extruded into various continuous forms such as sheets or strips. The process is described as being particularly useful as applied to scrap polyvinyl chloride sheet material reinforced with cotton fabric.

These processes of recycling or reclaiming scrap material, however, are not entirely successful and have not found widespread usage because of economic infeasibility and limitations on the types of article which can be made. Thus, it is among the objects of the invention to provide a process of recycling, reclaiming, and reutilizing scrap material, and particularly thermoplastic scrap material from the manufacture of floor covering or the subsequent removal of the floor covering after installation.

It is another object of the present invention to provide a new floor covering using the recycled and reclaimed scrap material.

SUMMARY OF THE INVENTION

These and other objects and advantages of the present invention are accomplished by a process for recycling waste polymeric material comprising a mixture of waste polymeric material wherein the waste polymeric material includes from about 15 to 50 percent aliphatic polyamide material; granulating the chopped mixture into fragments at least an order of magnitude smaller than the size of the waste polymeric material; and extruding the granulated mixture at a temperature of less than about the temperature at which the largest portion of waste aliphatic polyamide material decomposes. The process of the present invention can be used to make various articles of manufacture.

A floor covering is also provided. The floor covering comprises a carpet having textile fibers defining a fibrous upper outer face and a primary backing to which the textile fibers are secured and a secondary backing permanently adhered to the lower surface of the primary backing, the secondary backing comprising a matrix formed by granulating a coarsely chopped mixture of waste polymer material including 15 to 50 percent aliphatic polyamide material and extruding the granulated mixture at a temperature of less than temperature at which the largest portion of waste aliphatic polyamide material decomposes.

BRIEF DESCRIPTION OF THE DRAWINGS

Some of the objects and advantages of the invention having been stated, other objects will appear as the description proceeds when taken in conjunction with the accompanying drawings in which.

DETAILED DESCRIPTION OF THE PREFERRED EMBODIMENT

While the present invention will be described more fully hereinafter with reference to the accompanying drawings in which particular embodiments of the invention are shown, it is to be understood at the outset that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
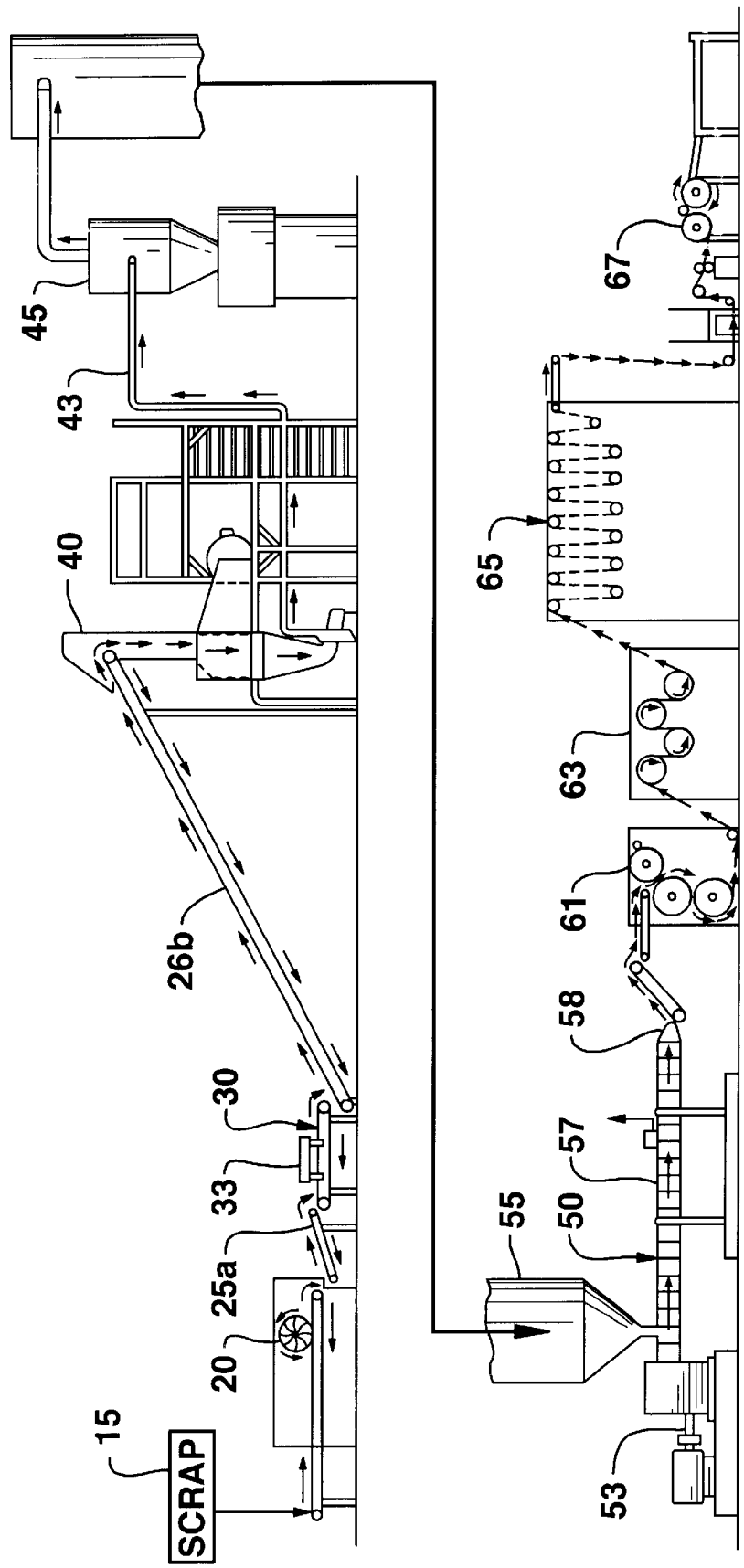
FIG. 1 is a diagrammatic view of the process in accordance with the present invention.

A preferred form of the process is illustrated in FIG. 1 wherein waste polymeric material (scrap) 15 is delivered to a chopper 20. The waste polymeric material typically comprises a wide variety of thermoplastic material generated during the manufacture of floor coverings and generated in the disposal of used floor coverings. Typical thermoplastic materials present include aliphatic polyamides, polyolefins (e.g., polyethylene and polypropylene), polymers based on vinyl monomers (e.g., vinyl chloride and vinyl esters such as vinyl acetate), and blends and copolymers thereof. The aliphatic polyamides must be present in the amount of about 15 to about 50 percent. It is believed that the aliphatic polyamides function as a compatibilizer for the other scrap thermoplastic materials. The term "aliphatic polyamide polymer" used herein and throughout the specification includes any long-chain polymeric or copolymeric amide which has recurring amide groups as an integral part of the main polymer or copolymer chain. Exemplary aliphatic polyamides include nylon 6 or poly($\omega$-caprolactam); nylon 66 or poly(hexamethylenediamineadipic acid) amide; poly (hexamethylenediamine-sebacic acid) amide or nylon 610; and the like.

The chopper 20 is any conventional chopper that coarsely chops the waste polymer material into ¾ to 1 inch in length portions. A suitable chopper is Model CT-60 available from Pieret, Inc. The chopped mixture is transported, for example, via a conveyer belt 25a to a metal detection station 30. Any foreign metal objects are detected by a metal detector 33 and removed so as to avoid damaging the equipment. The chopped mixture, free of any metal, is transported via conveyer belt 26b to a granulator 40 wherein the chopped mixture is finely granulated into fragments at least an order of magnitude smaller than the original size of waste polymeric material. Typically this is about ⅜ inch and smaller. A suitable granulator is Model 24-1 available from Cumberland Company. The granulated mixture is transported via air in a conduit 43 to a Gaylord loading station 45. If desired fines and dust can be removed and separated from the granulated mixture.

The granulated mixture is conveyed to an extruder 50. A suitable extruder is Model 2DS-K 57M 32or ZSK-170M 1750 10 G both available from Werner & Pfleiderer. The extruder 50 includes a control means 53 (e.g., a motor gear box) and a feeder 55. Control means 53 is provided to insure that the extruder 50 and feeder 55 act cooperatively to maintain the disparate materials in a starve fed condition throughout the conveying zone to a zone comprising one or more kneading zones (not shown). The materials then pass through an extruder barrel 57 including a degassing zone and then through a pumping zone which forces the same through a die 58. The pumping zone functions to develop sufficient through-put without creating intolerable back pressures in the preceding zones or on the thrust bearings of the extruder 50. The extruder is operated at a temperature selected to not exceed the temperature at which the largest portion of aliphatic polyamide waste material decomposes. Typically this is about 215° C. The extruded article of manufacture is calendared 61, cooled at a cooling station 63, and accumulated by a accumulator 65 and the article of manufacture rolled up at a collection station 63.

Exemplary articles of manufacture include secondary backings for floor covering, signs, building material, sound barriers, bulkheads, and the like.

Figure 2:
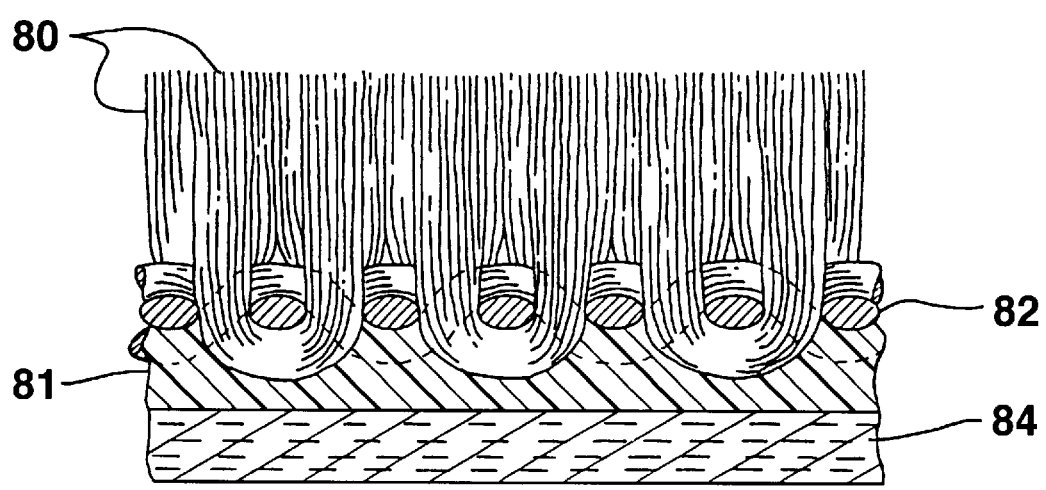
FIG. 2 is an enlarged sectional view of a floor covering in accordance with the present invention.

Referring to FIG. 2, a floor covering (e.g. a pile carpet) utilizing the article of manufacture is illustrated. Tufted pile yarns 80 are looped through a primary backing 82, and extend upwardly therefrom. The backcoating 81 is an adhesive coating that fixes the pile yarns in place in the primary backing. A secondary backing 84 (i.e., the article of manufacture) is then adhered to the backcoating using the backcoating or another adhesive. The primary backing 88 may be formed of natural fibers, such as jute, or of synthetic fibers such as polypropylene, polyethylene, or polyester, for example. As is conventional, the pile yarns 80 may be cut for form cut pile tufts as illustrated in FIG. 2, or may form loops (not illustrated).

The backcoating may be comprised of any suitable polymer compound. Typically the backcoating is comprised of either a polymer emulsion polymerization product or a polymer plastisol compound. The backcoating is cured on the textile material by heating or drying or in any way reacting the backcoating to harden it. An exemplary emulsion polymerization product includes a polyvinylidene chloride or ethylene vinyl copolymer with at least one acrylic monomer. Standard acrylic monomers include, for example, acrylic acid, methacrylic acid, esters of these acids, or acrylonitrile. Alternatively, the backcoating may comprise conventional thermoplastic polymers which are applied to the carpet by hot melt techniques known in the art.

To bond the secondary backing formed from floor covering waste polymer material using the method of the present invention, additional heat is applied to the backcoating. The secondary backing is contacted with the backcoating. The temperature is sufficient to partially melt the contacting surface of the secondary backing thereby bonding the secondary backing to the back coating forming an integral structure such as described in U.S. Pat. Nos. 3,560,284 and 3,695,487 to Wisotzky, the disclosures of which are incorporated herein by reference in their entirety.

The following example is set forth as a further illustration of the present invention and its applications. The various compositions set forth are exemplary and not to be considered as limiting. It will be apparent that many modifications and variations can be effected without departing from the scope of the present invention.

EXAMPLE

The waste, previously used carpet is obtained. The carpet is analyzed for the waste polymeric material present. The following materials are present:

| Material | Melt Point |
| --- | --- |
| polyethylene | 100–174° C. |
| polypropylene | 150° C. |
| polyvinylchloride | 116–138° C. |
| vinyl copolymers | 80–81° C. |
| nylon 6 | 216° C. |
| nylon 6, 6 | 255° C. |

Figure 3:
FIG. 3 is a SEM micrograph of an article of manufacture of the Example.

The waste carpet is chopped into fragments of about ¾ to 1 inch. The fragments are then granulated into a granulated mixture having fragments of less than ⅜ inch. The granulated mixture is extruded at a temperature of about 215° C., a pressure of about 120–200 psi and flow rate of about 7–15 thousand pounds per hour. A SEM micrograph of the resulting article is shown in FIG. 3 wherein the edge is cracked from the extruded edge and the view is parallel to the extrusion direction. The orienting of fibers can clearly be seen.

That which is claimed is:

1. A floor covering comprising a carpet having textile fibers defining a fibrous upper outer face and a primary backing to which the textile fibers are secured and a secondary backing permanently adhered to a lower surface of the primary backing, the secondary backing comprising a matrix formed by an extruded granulated coarsely chopped mixture of waste polymer material including 15 to 50 percent aliphatic polyamide material having a predetermined decomposition temperature and the remainder of the waste polymer material includes at least one polymeric material selected from a group consisting of polyethylene, polypropylene, vinyl esters, vinyl chloride and blends and copolymers thereof, the chopped material being extruded at a temperature less said predetermined decomposition temperature associated with the majority of the aliphatic polyamide material present in said chopped mixture of waste polymer material.

2. A floor covering according to claim 1 wherein the aliphatic polyamide material is selected from a group consisting of nylon 6, nylon 66 and nylon 610.

3. A floor covering according to claim 2 wherein said predetermined decomposition temperature is about 215° C.

\* \* \* \* \*

UNITED STATES PATENT AND TRADEMARK OFFICE
CERTIFICATE OF CORRECTION

PATENT NO. : 5,855,981
DATED : January 5, 1999
INVENTOR(S) : Stephen A. Zegler and Paul L. Weinle It is certified that error appears in the above-identified patent and that said Letters Patent is hereby corrected as shown below:

In Col. 4, Line 13: "-The primary backing 88 - " should be --The primary backing 82 --.

Signed and Sealed this

Fourth Day of May, 1999

Attest:

Q. TODD DICKINSON

Attesting Officer

Acting Commissioner of Patents and Trademarks